US007431201B2

(12) United States Patent
Brey et al.

(10) Patent No.: US 7,431,201 B2
(45) Date of Patent: Oct. 7, 2008

(54) SYSTEM AND METHOD FOR MANAGING REQUESTS TO DOCUMENT ARCHIVES, ROUTING REQUESTS AND DELIVERING REQUESTS TO A VARIETY OF CHANNELS OR DELIVERY MECHANISMS

(75) Inventors: Kari Brey, Andover, MN (US); Matthew Eliason, St. Paul, MN (US); Charles Hall, Beaverton, OR (US); Stephanie Wentland, Maple Grove, MN (US)

(73) Assignee: U. S. Bank Corporation, Minneapolis, MN (US)

( * ) Notice: Subject to any disclaimer, the term of this patent is extended or adjusted under 35 U.S.C. 154(b) by 346 days.

(21) Appl. No.: 10/888,157

(22) Filed: Jul. 9, 2004

(65) Prior Publication Data
US 2006/0006222 A1  Jan. 12, 2006

(51) Int. Cl.
G06Q 40/00 (2006.01)
G07D 11/00 (2006.01)
G07F 19/00 (2006.01)

(52) U.S. Cl. ........................ 235/379; 235/375; 235/382; 705/67; 705/44

(58) Field of Classification Search ................. 235/379, 235/382, 385, 487, 375; 902/7; 382/305; 709/201, 217, 219; 705/42, 35, 45, 44, 67
See application file for complete search history.

(56) References Cited

U.S. PATENT DOCUMENTS

| | | | | |
|---|---|---|---|---|
| 5,602,936 A | * | 2/1997 | Green et al. | 382/140 |
| 5,784,610 A | * | 7/1998 | Copeland et al. | 707/10 |
| 5,895,455 A | * | 4/1999 | Bellinger et al. | 705/35 |
| 6,557,039 B1 | * | 4/2003 | Leong et al. | 709/229 |
| 6,574,377 B1 | * | 6/2003 | Cahill et al. | 382/305 |
| 2002/0029200 A1 | * | 3/2002 | Dulin et al. | 705/67 |
| 2003/0208421 A1 | * | 11/2003 | Vicknair et al. | 705/35 |
| 2004/0133517 A1 | * | 7/2004 | Zubizarreta | 705/44 |
| 2004/0148235 A1 | * | 7/2004 | Craig et al. | 705/35 |
| 2005/0071283 A1 | * | 3/2005 | Randle et al. | 705/75 |
| 2005/0211763 A1 | * | 9/2005 | Sgambati et al. | 235/379 |
| 2006/0015450 A1 | * | 1/2006 | Guck et al. | 705/39 |

(Continued)

FOREIGN PATENT DOCUMENTS

FR  2568075 A1 *  1/1986  ............... 379/93.14

OTHER PUBLICATIONS

U.S. Appl. No. 10/799,378, filed Mar. 12, 2004, Chenevich et al.

(Continued)

*Primary Examiner*—Edwyn Labaze
(74) *Attorney, Agent, or Firm*—Foley & Lardner LLP

(57) ABSTRACT

An Archive Interface Manager (AIM) can provide a common interface between the image delivery channels and image archives. AIM handles requests and fulfillment of queries and images between the image delivery channels and the image archive/s. AIM processes requests for documents to the appropriate document archive/s and fulfills and returns a list of items that matches the request and subsequently, the requested item to the requestor. AIM processes the request, searching multiple archives, going to the appropriate place of record, combining the hit list with all the items and returning a single hit list with the matched request. AIM also allows the requestor to query and retrieve items without seeing a hit list such as in a request for a single item.

19 Claims, 6 Drawing Sheets

U.S. PATENT DOCUMENTS

2006/0186194 A1* 8/2006 Richardson et al. ......... 235/379
2006/0212391 A1* 9/2006 Norman et al. ............... 705/40

OTHER PUBLICATIONS www.ecognito.net/; printed on Jun. 21, 2004.
www.mylastwish.com/home.asp; printed on Jun. 21, 2004.
www.mangosoft.com/news/pr/20020211.asp; printed on Jun. 23, 2004.
www.newcenturybk.com/; printed on Jun. 23, 2004.
www.zionsbank.com/faq_zvault.jsp?leftNav=faq&topNav=; printed on Jun. 23, 2004.

* cited by examiner

US 7,431,201 B2

SYSTEM AND METHOD FOR MANAGING REQUESTS TO DOCUMENT ARCHIVES, ROUTING REQUESTS AND DELIVERING REQUESTS TO A VARIETY OF CHANNELS OR DELIVERY MECHANISMS

BACKGROUND OF THE INVENTION

1. Field of the Invention

The present invention relates to management of information using computer systems. More particularly, the present invention relates to systems and methods for managing requests to document archives, routing requests and delivering requests to a variety of channels or delivery mechanisms.

2. Description of the Related Art

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the claims in this application and is not admitted to be prior art by inclusion in this section.

Currently, many financial institutions have launched imaging systems and others are in the process of doing so. As banks and other financial institutions begin to share and exchange images and as the so-called "Check 21 laws" involving electronic check settlement go into effect on Oct. 28, 2004, there is a need to access multiple archives with images, such as check images. However, most institutions have only developed single archive image solutions. Such solutions cannot interface with multiple systems simultaneously. They must run separate processes that take additional time, space, and expense to run.

Thus, there is a need for a system that allows financial institutions, like banks, to service imaging needs across multiple channels with an integrated, channel-consistent strategy and to service multiple business lines with multiple needs. Further, there is a need for a system and method that offers a common interface between delivery channels and archives. Further, there is a need to manage and process check images maintained at multiple archives and repositories. Even further, there is a need to manage requests to document archives, route such requests and deliver the requests to a variety of channels or delivery mechanisms.

SUMMARY OF THE INVENTION

An exemplary embodiment relates to a software application that offers a common interface between image delivery channels and image archives. This exemplary embodiment handles requests and fulfillment of queries and images between the image delivery channels and the image archive/s. Such systems interact with internal document repositories, other financial institutions' image archives, independent and government clearing houses for images and financial transactions, and external image or paper document repositories.

The exemplary embodiments include an Archive Interface Manager (AIM) that allows, but is not limited to, the requestor's ability to use one delivery channel to complete all image or microfilm retrieval requests from image archive/s. The user experience allows the requestor to search or request any item in any internal or external archive with minimal knowledge of the transaction or archive location of the image or media. AIM supports multiple archives with the goal to ensure completeness of image requests. For example, one requester may request five images from disk, ten from tape, and twenty from cold storage. AIM retrieves images from one or multiple archives and has intelligence built in to retrieve them from one archive or from multiple archives and bundle them into one fulfillment and return the bundled fulfillment request to the requestor. AIM intelligently makes assessments of which archives need to be queried based on date criteria, and when necessary queries multiple archives in parallel. The results of all queries are merged together to present a unified hit list to the requestor.

Exemplary embodiments described herein have intelligence built in to allow multiple image archives to be pulled together to act like a single archive without creating an "all items" file while keeping the multiple processing and sources transparent to the requester. This functionality facilitates adding new archives and supporting pre-existing archive systems. As such, image exchange and image archives of other banks can be supported. For example, the exemplary embodiments can intelligently take an image request, determine which archive/s to go to for retrieval, combine a hit list of results from multiple archives and present a single, combined hit list to the requester.

By way of example and not limitation, one exemplary embodiment relates to a method of managing archive interfaces to plurality of archives. The method includes receiving an item request from a requesting application in a common format, identifying an archive where the requested item is located, communicating a request to the identified archive for the requested item, and communicating the requested item to the requesting application. The item is located in at least one archive of a plurality of archives. The item request corresponds to an image of a financial information document.

Another exemplary embodiment relates to a software application that provides a common interface between image delivery channels and image archives. The software application includes computer code to handle requests and fulfillment of queries and images between image delivery channels and a plurality of image archives, where the images are checks.

Another exemplary embodiment relates to a system of providing a common interface between image delivery channels and image archives. The system includes an archive interface manager, a plurality of archives containing check images, and programmed instructions executed by the archive interface manager to convert protocols of requested images to a common format, determine destination archive for a received request, and access the determined destination archive from the plurality of archives containing check images to retrieve the requested images.

DETAILED DESCRIPTION OF EXEMPLARY EMBODIMENTS

The following detailed description illustrates a request and retrieve functionality to handle a single request going to multiple archives. In this explanation, for purposes of illustration, example scenarios are addressed, such as generating a consolidated hit list from multiple indexes and retrieving from multiple archives. The invention is not limited to these examples or any other illustration provided.

Figure 1:
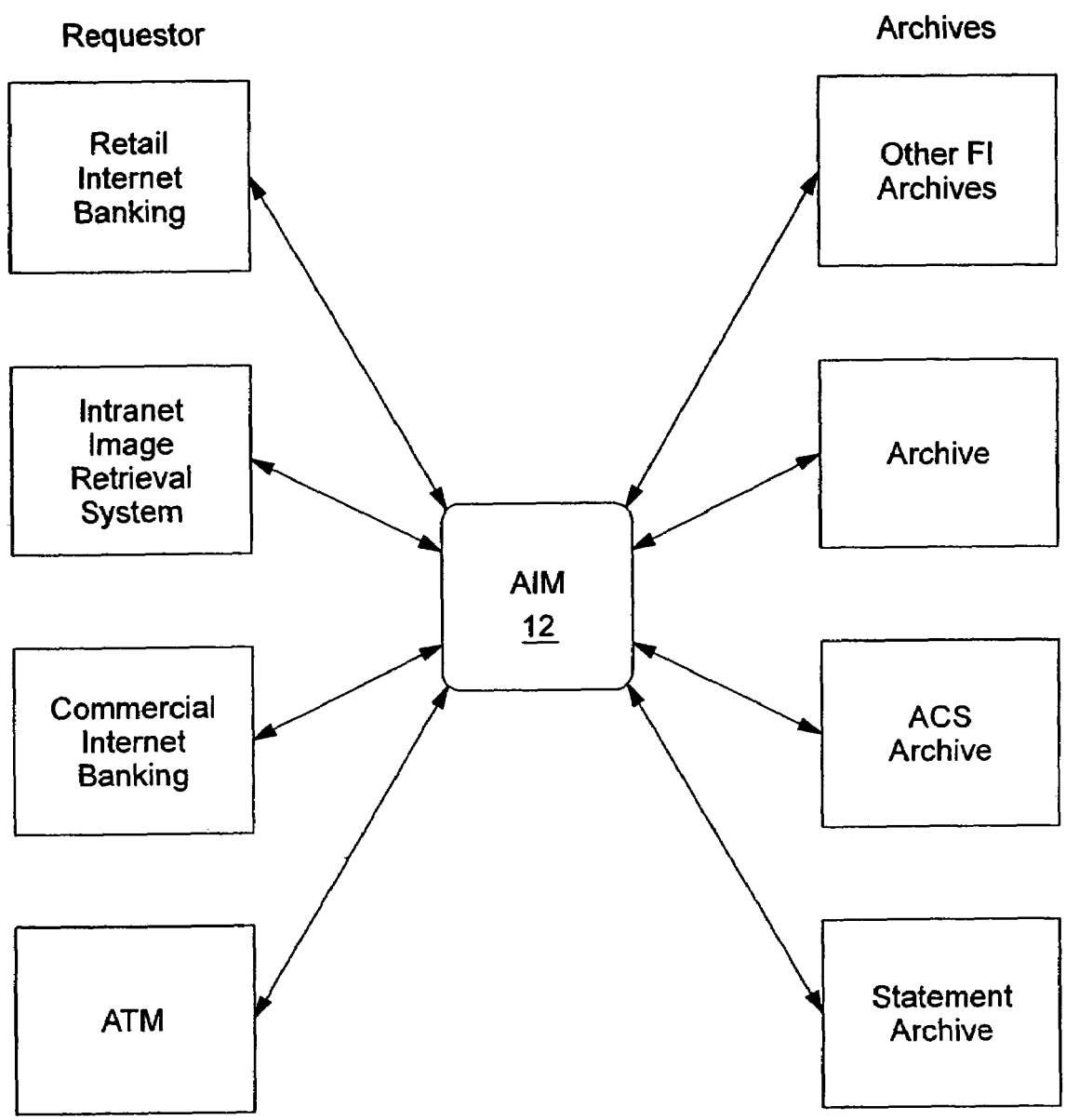
FIG. 1 is a general diagram depicting functions involving an archive interface manager in accordance with an exemplary embodiment.

FIG. 1 depicts an example functional diagram for a check image or image statement (and other documents like deposit slips) request. On the left are boxes with four potential channels where a customer or requestor would start a request. The customer can make a request from a retail internet banking web site, an intranet image retrieval system, a commercial internet banking site, or an ATM. Other locations or facilities may also be used to enable the request of a check image. On the right are four boxes depicting different archives where the image may be stored. For example, images may be located in other financial institution (FI) archives, a statement archive, or other archives.

The customer logs in to Internet banking or some other access or request point and requests an image document or documents. The request is routed to an archive interface manager (AIM) 12. The AIM 12 determines which archive to query based on date (or some other parameter). When requested, the AIM 12 retrieves the image documents based on which archive the item was found during the query operation. The AIM 12 pulls the image from the archive and delivers the image back to the customer who requested the image via the channel they initiated the request from.

Figure 2:
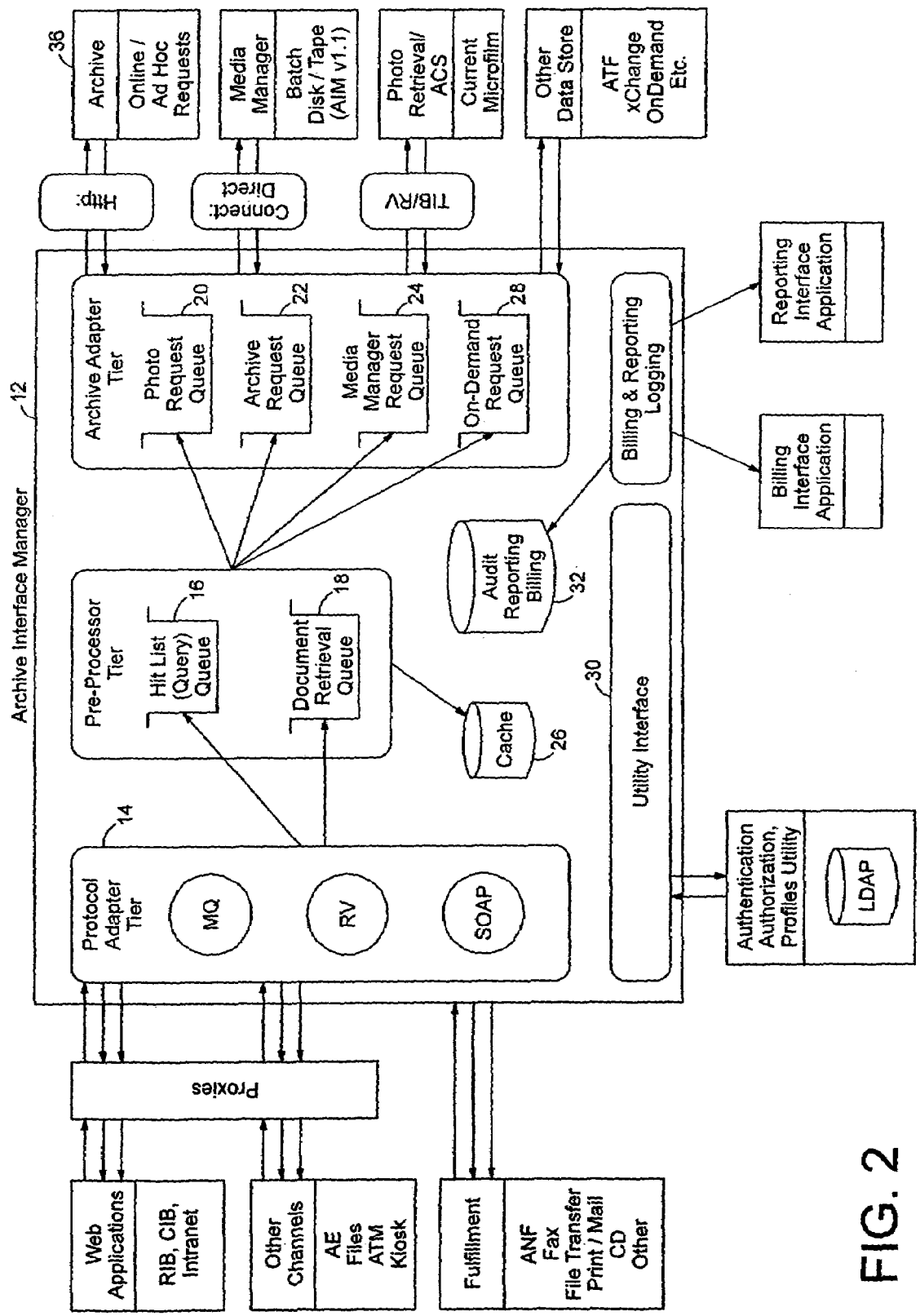
FIG. 2 is a diagram depicting a system including an archive interface manager and its functionality according to an exemplary embodiment.

FIG. 2 illustrates the archive interface manager 12 that processes image retrieval requests to appropriate document archives and requests the items when found. The archive interface manager (AIM) 12 includes an adapter tier 14, a hit list request queue 16, a document retrieval queue 18, a photo request queue 20, an archive request queue 22, a media manager request queue 24, a cache database 26, an on demand request queue 28, utility interfaces 30, and a billing database 32. The AIM 12 can be included in an AIM system.

The hit list queue 16 and the document retrieval queue 18 are part of a pre-processing tier of the AIM 12 where search requests are received, interpreted, and submitted to the correct archive. The AIM pre-processing tier has a pre-processor that searches all archives or specific archives based on request date. The AIM 12 combines the search results from the various archives into one hit list for presentation to the client application (channel). When AIM 12 receives a larger number of requests than it can handle at a given point of time, excess requests beyond AIM's capacity are rejected. The archive queue 22 receives all search requests that need to go to archive 36, as well as all retrieval requests for images located on other archives.

The media manager request queue 24 receives and processes the requests that need to go to a tape archive. This includes images older than 90 days. The photo request queue 20 receives and processes the requests that need to go to the photo retrieval area of the bank. The on demand request queue 28 receives and processes the requests that need to go to the on demand statement archive.

The cache database 26 is a temporary staging area of documents. When a channel asks for images that cannot be delivered immediately, they are sent to the cache database where the channels can come and get them. The cache database 26 holds the image a certain number of days based on the channel's request.

The utility interfaces 30 provide the AIM 12 with access to specific systems. The system depicted in the diagram is the Lightweight Directory Access Protocol (LDAP) interface for authentication. Other systems may be accessed via the utility interface. The billing database 32 is a database that takes in the information to send to a mainframe to bill a client's account for an image retrieval. It is a pass-through database of information and not actually the billing mechanism.

On the left of FIG. 2 are boxes depicting the primary requesting source for image documents. The boxes on the far right of FIG. 2 depict the many archives that ATM 12 searches and from which it retrieves document images. The middle square depicts AIM 12. AIM layering allows channels to easily submit requests. There are three layers: protocol adapter, preprocessing, and archive adapter. The far left web application asking for an image or hit list comes into the first layer. The second layer interprets the request and routes it. The third layer retrieves the information, returning the information (either query results or image/document) to the client channel. The protocol adapter tier is responsible for translating requests to a common format. Some channels submit a request via MQSeries, or via SOAP, which are converted to a common protocol. Channels that are able to submit requests to the AIM 12 via the common protocol are able to bypass this tier of processing.

The pre-processor tier in the center of the box referring to AIM 12 forwards requests to the appropriate archive for processing. The archive adapter tier of the AIM 12 on the right of the box, depicts another layer including groups of distinct processes that all serve a common purpose: to access and integrate with the various archives in a seamless fashion for all Web applications (channels).

The AIM 12 intelligently processes an image retrieval request to the appropriate document archive/s and returns a list of items (hit list) that matches the request and subsequently, the requested item/s to the requester. The AIM 12 processes the request, searches multiple archives, goes to the appropriate place of record, combines the hit list with all the items and returns a single hit list with the matched request. The AIM 12 also allows the requester to query and retrieve items without seeing a hit list such as in a request for a single item. The AIM 12 allows for retrieval of all document images and photos residing in any archive. The AIM 12 is flexible and extendable for multiple channels based on the channel's specific requirements and to multiple archives.

In an exemplary embodiment, the AIM 12 addresses the creation of databases and interfaces between the requesting and delivery channels, image billing and reporting applications. Possible delivery channels include the web intranet and internet (retail and commercial) applications and adjustments express (A/E). The distribution channels include fax, print, CD ROM and other secure file transfers. The archive interfaces can include disk, tape, microfilm, and other archives.

By allowing users to conveniently and efficiently search for items through a consolidated search form, the requesting application is able to submit a single query to the AIM system and obtain an amalgamated query response/hit list of items located in multiple archives. The AIM system contains application logic for parsing the single query into sub-queries, launching an appropriate number of threads to execute all sub-queries in parallel, and gathering sub-query results from all archives where each sub-query result includes meta information of an item describing how to retrieve its images/documents. Before responding to the requesting application, the AIM system waits for all sub-query responses and maps the content of each archive response into a single query response back to the client. If any sub-query times out, the AIM system is able to gracefully handle this scenario and provide notification of a partial query response/hit list back to the client.

Query responses to the client tier contain meta information about an item. By maintaining item information, the AIM system ensures the successful retrieval of its corresponding images/documents, even in a multiple archive retrieval scenario. When the requesting application submits an item retrieval request to the AIM system, AIM is able to extract the meta information for each item and divide the retrieval request per archive. Once again using multiple threads, the AIM system submits its retrieval requests to multiple archives in parallel. Depending on archive availability, AIM is able either to wait for the actual images/documents from the archive and return the images/documents to the requesting application or to return a confirmation message to the requesting application if the archive is not a live, transactional system.

The AIM 12 can support any channel in the way that channel wants to interact with the archives and any way that channel may be delivering a request. AIM offers flexibility with features in the channel application; for example, flexibility in delivery methods such as sending an image through the Advanced Network Foldering (ANF) system to be sent through the U.S. Postal Service, fax or the actual protocol the channel wants to use. It also offers flexibility in the messaging protocol and can accommodate a request via an external vendor.

The AIM 12 can function with a variety of notifications such as an email or secure message. AIM also provides the flexibility of generating and returning the combined hit list or just retrieving the image/s. It first generates and delivers a combined a hit list and secondly, retrieves the items on the hit list. Advantageously, the AIM 12 makes use of existing systems of record, rather than employing the all items database/master index model that the interviewed bank and other banks have implemented. For example, one archive may have posting account and Magnetic Ink Character Recognition (MICR) account information in its index; other archives may only have MICR account while other archives may not have an account number. The AIM 12 offers a secure, common API for the different business channel applications.

Advantageously, the AIM 12 facilitates decisioning the location of the item, image fulfillment and provides status of the request and the requested item(s) back to the requesting or delivery channel. The AIM 12 acts as an interface between the delivery platforms and all image archives (e.g., image repositories, microfilm repositories, as well as, external vendors and software).

The AIM 12 also collects data, error and status, which allows detailed reporting and billing on the success or failure of submitted requests including the time required to complete Image and Photo requests through retrieval locations. The AIM 12 directs, and collects data on requests. The AIM 12 does system-level authentication and directs, and collects data on image and photo requests made through any of the requesting and delivery channels. The types of items being requested can include: imaged paper documents from capture platforms (Check Processing Capture System (CPCS) and Point of Presentment (POP).

The AIM 12 acknowledges and interprets a photo or image request and directs the request and/or splits the request to the proper image archive/s or microfilm archive/s source/s. The AIM 12 maintains a status of the request and direct completed requests back to the appropriate delivery channels. The AIM 12 tracks when a request has been completed. The AIM 12 receives completed requests from the identified archive/s and forward the completed requests to the requesting and/or delivery channel. The AIM 12 indicates incomplete requests (not finished) and return those to the customer via methods to be determined (i.e. U.S. Postal Service, fax, eMail, Screen Display, etc.). The request status can be collected by the AIM 12 and made available to a customer service area via a delivery channel for customer support. The AIM 12 sends request statuses back to the requesting and/or delivery channel, indicating requests that are being processed. The AIM 12 captures data for metrics and billing.

The AIM 12 performs image transformation by transcoding the images from an archive format to the channel's requested format. For example, the AIM 12 removes the MO:DCA wrapper and provides front and back images. The front can be a TIFF file and the back a JPEG file. The AIM 12 is not limited to these formats, as it will accept formats from other institutions that may not be consistent with the home institution's formats. The AIM 12 can also be transcode to a "more" viewable image i.e. PNG (Portable Network Graphics.)

The AIM 12 can support all requesting and delivery channels. The AIM 12 can prioritize requests based on size of requests or can prioritize by requestor, location or a variety of business rules developed by the channels. The AIM 12 can provide the number of items and the channel determines the number of items to present as well as the ordering and numbering of the items. The AIM 12, through its inquiry functions, can estimate the time required to complete long running requests. It can allow querying the status of long running requests.

Figure 3:
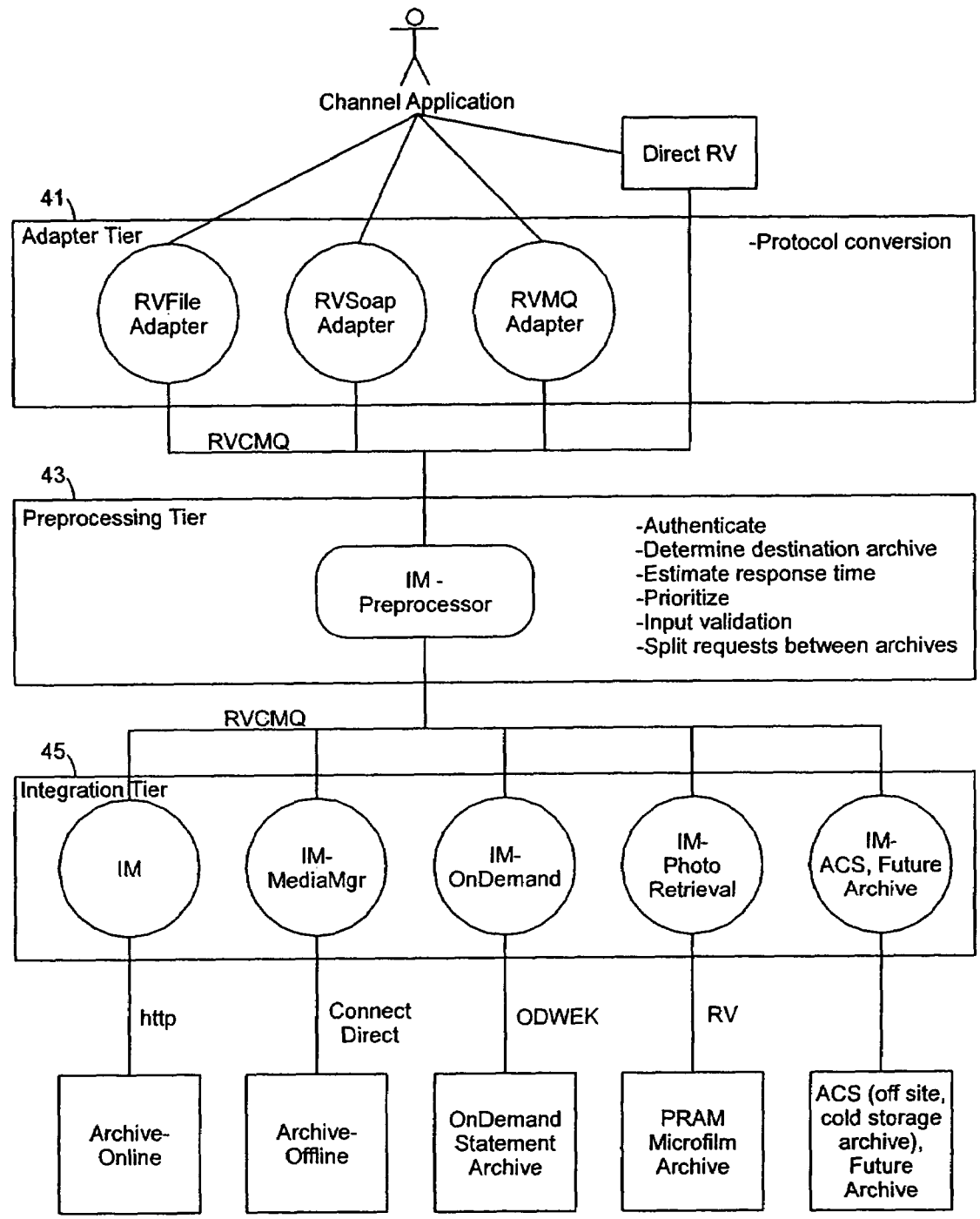
FIG. 3 is a general diagram depicting an integration layer design according to an exemplary embodiment.

FIG. 3 illustrates a design of an integration layer for a system including the AIM 12 described with reference to FIG. 2. Each circle (and circular rectangle) in FIG. 2 represents an integration manager process. In an exemplary embodiment, the integration layer design is a web of interconnected integration manager processes, with the links between each layer of this 'web' handled with a product supporting a common protocol.

A channel application interfaces with the AIM 12 via an adapter tier 41. In some situations, the channel application uses the common protocol used by the AIM 12 in which case no protocol conversion is necessary. For other protocols, adapter modules are included in the adapter tier 41 to convert into the common protocol. Once the communication is in the proper protocol, a pre-processing tier 43 authenticates the communication, determines a destination archive, estimates a time for a response to be generated, prioritizes requests, inputs validations, and splits requests between archives. In some embodiments, the pre-processing tier 43 determines the destination archive based on the date of the image. Recent images may be located in a first archive whereas older images are located in a second archive and even older images are located in yet a third archive. The destination may also be determined based on the financial institution on which the check account is drawn. Different financial institutions may have images located on different archives.

An integration tier 45 connects the pre-processing tier 43 with archives. The integration tier 45 can communicate with the archives using the HTTP protocol, a direct connection, On Demand Web Develoment Kit (ODWEK), a common protocol (e.g., Rendezvous), or other connection protocols.

Figure 4:
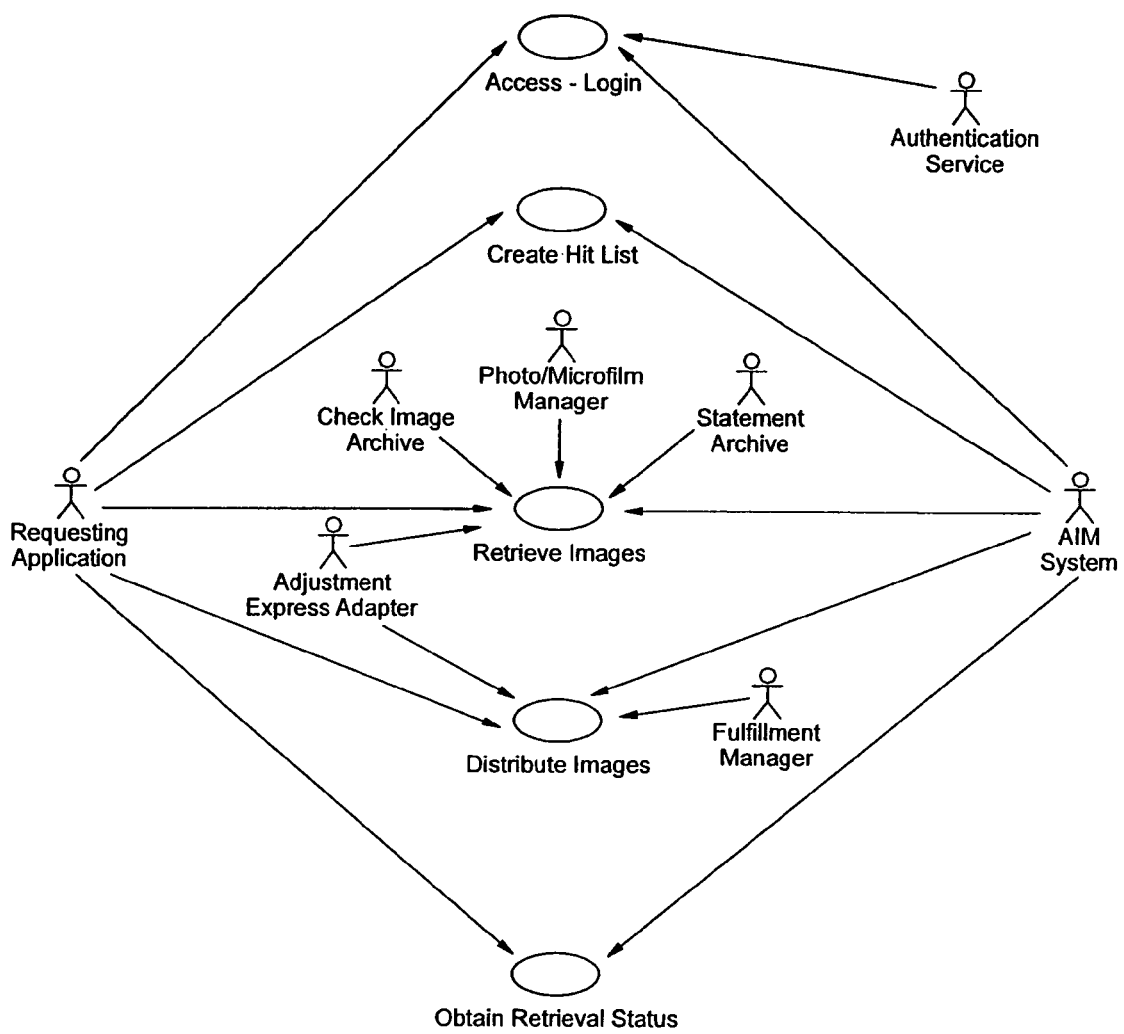
FIG. 4 is a diagram depicting a use case scenario according to an exemplary embodiment.

FIG. 4 illustrates an exemplary use case of a system including the AIM 12 described with reference to FIG. 1. In the exemplary use case, a requesting application accesses the system after an authentication service determines the identity of the requesting application is proper. After accessing the system, the requesting application creates a hit list of searched items using the AIM system in conjunction with check image archives, statement archives, and a photo or microfilm manager.

Once a hit list is formed, images are retrieved from various archives and the images distributed. A fulfillment manager may manage the distribution process and check for errors. An adjustment express adaptor can expedite the processing of retrieving images or distribution of images as the need or demand arises. The requesting application can obtain retrieval status from the AIM system upon request.

Figure 5:
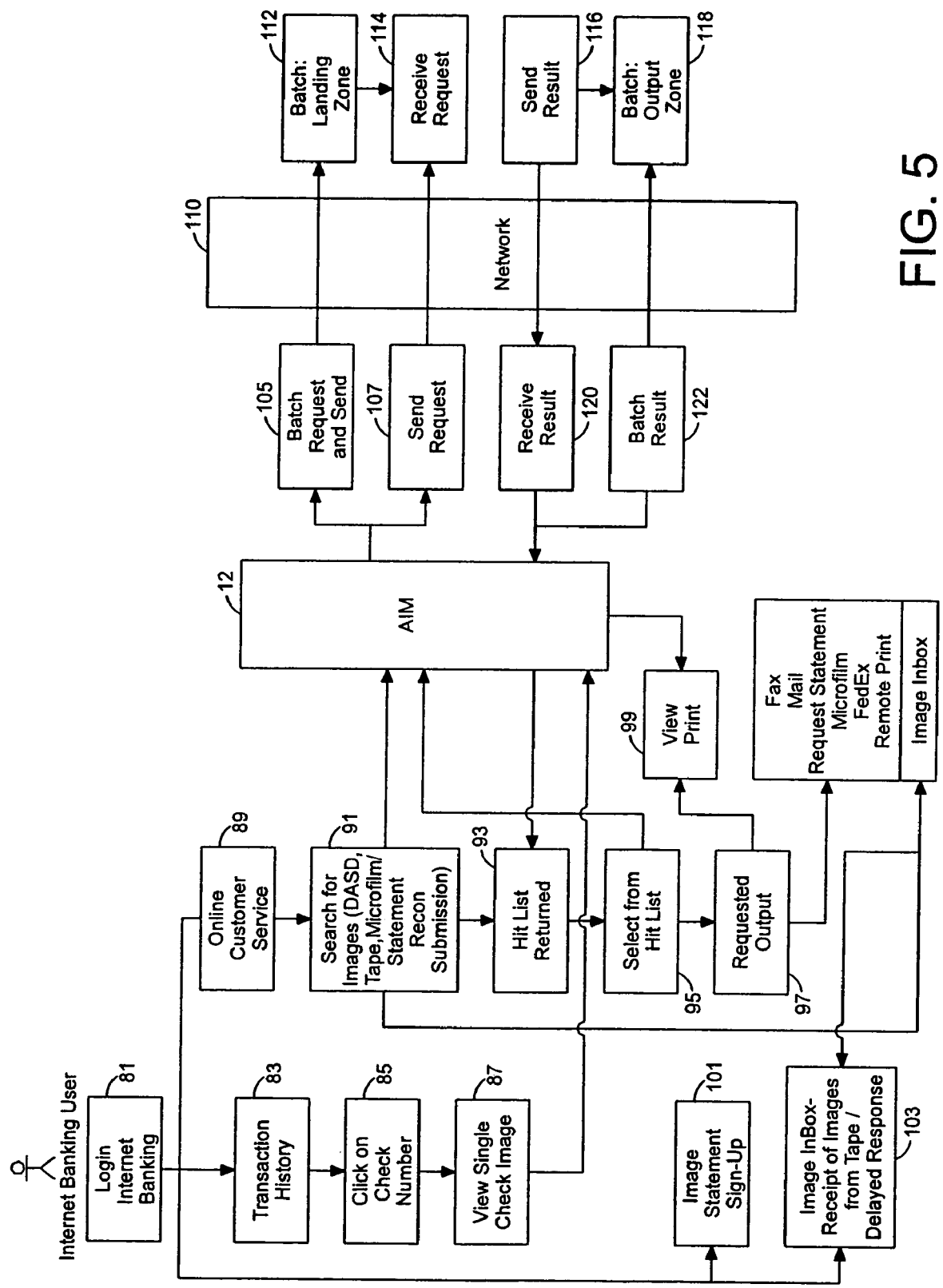
FIG. 5 is a flow diagram of exemplary operations performed in a banking system including an archive interface manager.

FIG. 5 illustrates an exemplary flow of a customer requesting a check image via internet banking using the AIM 12 described with reference to FIGS. 1-4 above. FIG. 5 depicts the pages the customer chooses within internet banking such as the checking account transaction history page and how the customer requests a check image. The flow continues as the check image request goes through the AIM 12 which determines the archive where the requested image is stored from the many archives available. It shows the AIM 12 returning the image request back to the user on internet banking.

A customer can access the image delivery system by logging in at a block 81. Logging in can include entry of a user name and password or personal identification number (PIN). Once logged in, the customer can access a transaction history at a block 83. If the transaction history is accessed, the customer can click on a check number displayed on a user interface at a block 85. A single check image is then obtained using the AIM 12 described with reference to FIG. 2. The customer can view the single check image at a block 87. The image can be viewed using an viewer user interface. In an exemplary embodiment, the viewer interface allows the user to see both the front and back of the check. The user can also zoom in the user interface to see various portions of the check in closer detail.

After logging in at block 81, the customer can access online customer service at a block 89. From online customer service, a customer can search for images on disk, tape, microfilm, or other media at a block 91. The AIM 12 is accessed to provide a hit list of images searched at a block 93. The customer can then select from the hit list in a block 95. The requested output is provided in a block 97 and the customer can view or print the images at a block 99.

After logging into the internet banking (block 81), the customer can also access alternative services. For example, the customer can select an image statement service at a block 101 or a receive images from tape in a delayed response service at a block 103.

When obtaining requested images, the AIM 12 can request images from archives by batching requests and sending them in mass at a block 105. Alternatively, AIM 12 can send individual image requests at a block 107. The request from block 105 or block 107 travels over a network 110, such as a virtual private network (VPN), and received at block 112 or 114. Once the result is found, it is sent individually at a block 116 or, alternatively, the result is sent in a batch at a block 118. The AIM 12 receives the result at a block 120 in the case where individual results are communicated and at a block 122 in the case where batches of results are communicated.

In an exemplary embodiment images are stored in different archives according to date. For example, images that are less than 90 days old are stored at a disk storage. Images that are greater than 90 days old are stored in a media manager, such as in a tape format. Images that are more than three years old can be stored in a cold storage or warehouse storage facility. Images can also be archived by other information, such as issuing financial institution, check amount, or other check or financial information document identification.

Figure 6:
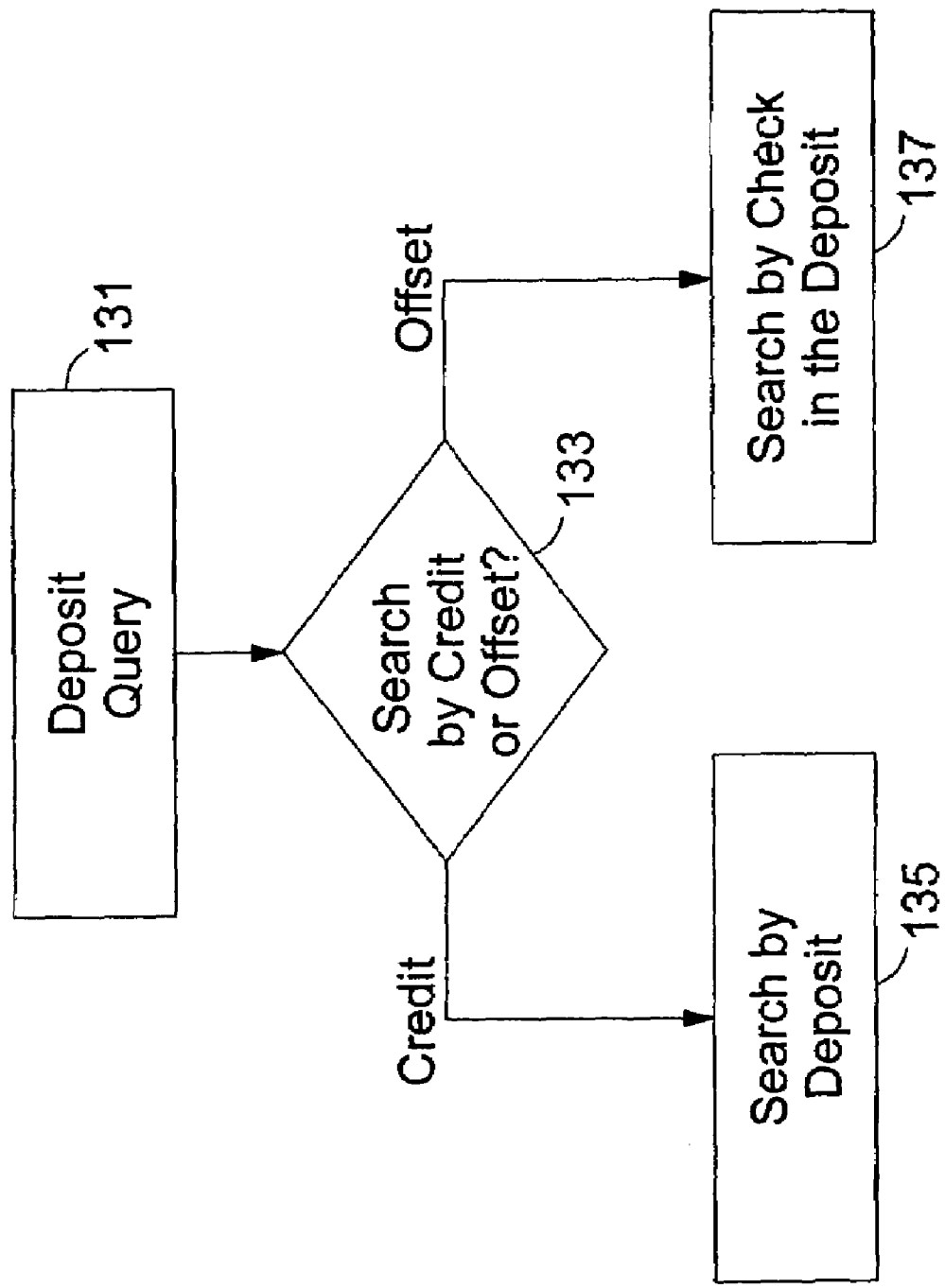
FIG. 6 is a flow diagram of a deposit query feature of the banking system of FIG. 5.

FIG. 6 illustrates a flow diagram depicting exemplary operations in a deposit query feature performed in an AIM system. Additional, fewer, or different operations may be performed depending on the embodiment. In an operation 131, a deposit query is made using the AIM 12 described with reference to FIGS. 1-5 above. In an operation 133, a determination is made as to whether the query is by credit (operation 135) or by offset (operation 137). For example, if a customer makes a deposit of $1,000 that is made up of ten $100 checks, the customer can search for the $1,000 deposit either by specifying criteria for the $1000 deposit (operation 135) or one of the $100 checks within that deposit (operation 137).

While several embodiments of the invention have been described, it is to be understood that modifications and changes will occur to those skilled in the art to which the invention pertains. For example, although the exemplary embodiments are described using the example of a bank accessing check images at multiple disparate image archives, the invention can extend to any institution accessing check images from multiple locations or archives, including for example point of sale (POS) retail, third party accounts receivable departments, or others. The invention is not limited to a particular embodiment, but extends to various modifications, combinations, and permutations that nevertheless fall within the scope and spirit of the appended claims.

What is claimed is:

1. A method of managing archive interfaces to a plurality of archives, the method comprising: receiving, at a first financial institution, an item request from a requesting application in a common format, the item being located in at least one archive of a plurality of archives at a second financial institution, wherein the item request corresponds to an image of a financial information document, wherein the first and second financial institutions are distinct; identifying the one archive of the plurality of archives at the second financial institution where the requested item is located; communicating a request to the identified at least one archive for the requested item; communicating the requested item to the requesting application, and further comprising parsing the request into sub-queries, launching an appropriate number of threads to execute all sub-queries in parallel, and gathering sub-query results from applicable plurality of archives wher information of an item describing how to retrieve its images.

2. The method of claim 1, wherein the financial information document requested is a check image, deposit slip, GL ticket, lobby payment, or other bank-related documents.

3. The method of claim 1, further comprising providing the requesting application with a hit list of items satisfying the item request.

4. The method of claim 1, wherein the item request comprises a request for multiple images.

5. The method of claim 1, wherein identifying the at least one archive where the requested item is located comprises identifying a date associated with the requested item and selecting the at least one archive based on the identified date.

6. The method of claim 1, wherein identifying the at least one archive where the requested item is located comprises identifying a financial institution associated with the requested item and selecting the at least one archive based on the identified financial institution.

7. The method of claim 1, wherein communicating a request to the identified one archive for the requested item comprises communicating a batch of requested items to the identified one archive.

8. The method of claim 1, wherein communicating the requested item to the requested application comprises communicating a batch of requested items to the requesting application.

9. A software application that provides a common interface between image delivery channels and image archives, the software application comprising:
- computer code to handle requests and fulfillment of queries from a first financial institution and images from a second financial institution between image delivery channels and a plurality of image archives, wherein the images are checks, wherein the first and second financial institutions are distinct; and
- computer code to parse requests into sub-queries, launch threads to execute all sub-queries in parallel, and gather sub-query results from applicable plurality of archives where each sub-query result includes meta information of an item describing how to retrieve its images.

10. The software application of claim 9, wherein the fulfillment of queries comprises providing a hit list of images found in a search.

11. The software application of claim 9, wherein the computer code identifies archives where requested images are located.

12. The software application of claim 11, wherein the archives are identified based on dates associated with check images requested.

13. The software application of claim 11, wherein the archives are identified based on a financial institution associated with check images requested.

14. A system of providing a common interface between image delivery channels and image archives, the system comprising:
- an archive interface manager at a first financial institution;
- a plurality of archives containing check images at a second financial institution, wherein the first and second financial institutions are distinct; and
- programmed instructions executed by the archive interface manager to convert protocols of requested images to a common format, determine a destination archive for a received request, access the determined destination archive from the plurality of archives containing check images to retrieve the requested images, parse image requests into sub-queries, launch threads to execute all sub-queries in parallel, and gather sub-query results from applicable plurality of archives where each sub-query result includes meta information of an item describing how to retrieve its images.

15. The system of claim 14, wherein the destination archive is determined based on date of a check whose image is requested.

16. The system of claim 14, wherein the destination archive is determined based on a financial institution where a checking account corresponding to the check is located.

17. The system of claim 14, wherein the destination archive is determined based on a financial institution receiving a check whose image is requested.

18. The system of claim 14, further comprising an authorization module coupled to the archive interface manager to authenticate access to the requested images.

19. The system of claim 14, further comprising a subscriber computer coupled to the archive interface manager via the Internet.

* * * * *